US007100107B2

(12) United States Patent
Creamer et al.

(10) Patent No.: US 7,100,107 B2
(45) Date of Patent: Aug. 29, 2006

(54) METHOD OF CHANGING SERVICE ATTRIBUTES IN A SERVICE LOGIC EXECUTION ENVIRONMENT

(75) Inventors: Thomas E. Creamer, Boca Raton, FL (US); Zygmunt A. Lozinski, Papworth Everard (GB); Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 09/867,831

(22) Filed: May 30, 2001

(65) Prior Publication Data

US 2002/0184268 A1 Dec. 5, 2002

(51) Int. Cl.
*G06F 9/00* (2006.01)

(52) U.S. Cl. .................. 715/513; 715/500; 715/530

(58) Field of Classification Search ........... 715/500, 715/500.1, 505, 513, 515, 516, 530
See application file for complete search history.

(56) References Cited

U.S. PATENT DOCUMENTS

| | | | |
|---|---|---|---|
| 5,301,270 A | | 4/1994 | Steinberg et al. |
| 5,819,092 A | * | 10/1998 | Ferguson et al. ............ 717/113 |
| 5,867,494 A | * | 2/1999 | Krishnaswamy et al. ... 370/352 |
| 5,867,495 A | * | 2/1999 | Elliott et al. ................. 370/352 |
| 5,920,692 A | | 7/1999 | Nguyen et al. |
| 5,999,525 A | * | 12/1999 | Krishnaswamy et al. ... 370/352 |
| 6,006,251 A | | 12/1999 | Toyouchi et al. |
| 6,061,721 A | | 5/2000 | Ismael et al. |
| 6,098,116 A | | 8/2000 | Nixon et al. |
| 6,324,552 B1 | * | 11/2001 | Chang et al. ............. 715/501.1 |
| 6,335,927 B1 | * | 1/2002 | Elliott et al. ................ 370/352 |
| 6,434,578 B1 | * | 8/2002 | McCauley et al. .......... 715/517 |
| 6,731,625 B1 | * | 5/2004 | Eastep et al. ................ 370/352 |
| 2001/0056439 A1 | * | 12/2001 | Carro ....................... 707/500.1 |
| 2002/0087598 A1 | * | 7/2002 | Carro .......................... 707/513 |
| 2002/0087945 A1 | * | 7/2002 | Marshall et al. ............. 717/107 |
| 2003/0159109 A1 | * | 8/2003 | Rossmann et al. .......... 715/513 |
| 2004/0111669 A1 | * | 6/2004 | Rossmann et al. .......... 715/513 |

OTHER PUBLICATIONS

Brackenbury, et al., *IBM's Enterprise Server for Java*, vol. 37, No. 3, pp. 323-335, (1998).
T. Spitzer, DBMS, *Tools & Strategies for IS Professionals*, vol. 10, No. 10, (Sep. 1997).
Keijzer, et al., *JAIN: A New Approach to Services in Communication Networks*, pp. 94-99, IEEE Communications Magazine, (Jan. 2000).

(Continued)

*Primary Examiner*—Stephen Hong
*Assistant Examiner*—Gregory J. Vaughn
(74) *Attorney, Agent, or Firm*—Akerman Senterfitt

(57) ABSTRACT

A method of directly changing a service attribute corresponding to a service component through a hypermedia document. The hypermedia document can provide an interface to a service logic execution environment (SLEE). The method can include providing a plurality of selections embodied in the hypermedia document. The plurality of selections can correspond to the service attribute. The method further can include receiving a user specified selection in the hypermedia document and generating a SLEE compatible event based on the user selection. The event can be of a type which the service component has been registered in the SLEE to receive. Also, the event can be routed to the service component via the SLEE. The service component can process the event and update service attribute information corresponding to the service attribute consistent with the event.

19 Claims, 3 Drawing Sheets

OTHER PUBLICATIONS

Jain, et al., *Java Call Control, Coordination, and Transactions*, pp. 108-114, IEEE Communications Magazine, (Jan. 2000).

Beddus, et al., *Opening Up Networks with JAIN Parlay*, pp. 136-143, IEEE Communications Magazine,(Apr. 2000).

Bhat, et al,. *JAIN Protocol APIs*, pp. 100-107, IEEE Communications Magazine, (Jan. 2000).

S. Silberstang, *Service Creation for Advanced Intelligent Networks Utilizing Intelligent Peripherals*, (Mar. 2001) <http://www.amarex.com/service.html>.

Keijzer, et al., *The Telephony Interoperability Challenge*, Sun Journal, (Mar. 2001) <http://www.sun.com/dot-com/sunjournal/v3n2/Telephony.html>.

JAIN™ : *Integrated Network APIs for the JAVA™ Platform*, (Sep. 2000) <http://www.java.sun.com/products/jain/>.

JAIN™ SCE/SLEE API Specification, (Mar. 2001) <http://www.javasoft.com/aboutJava/communityprocess/jsr/jsr_022_jsce.html>.

*Software Patent Institute Database of Software Technologies*, TDB0499.0069, (Apr. 1999) <http://www.spi.org>.

Brackenbury I.F. et al., IBM's Enterprise Server for Java, IBM Systems Journal, vol. 37, No. 3, pp. 323-335, (1998).

"Client Application for Integrating a Development Environment with a Web Distributed Authoring (WebDAV) Server", IBM Technical Disclosure Bulletin, Serial No. TDB0499.0069, (Apr. 1999).

Spitzer, Tom, "Component Architectures", DBMS Tools & Strategies for IS Professionals, pp. 56-66, (Sep. 1997).

\* cited by examiner

METHOD OF CHANGING SERVICE ATTRIBUTES IN A SERVICE LOGIC EXECUTION ENVIRONMENT

BACKGROUND OF THE INVENTION

1. Technical Field

This invention relates to the field of telecommunications, and more particularly, to a method of directly changing service attributes corresponding to service components.

2. Description of the Related Art

The development of the open network application programming interface (API) represents an important departure from the traditional method by which the architecture of the public switched telephone network (PSTN) was first opened. Traditionally, the Advanced Intelligent Network (AIN) architecture defined a call model which allowed the creation of telecommunications service applications outside of the switch environment. Telecommunications service applications are a la carte telecommunications applications which can perform enhanced services for a telecommunications session established among two or more parties. Exemplary service applications can include Call Waiting, Caller ID, Call Forwarding, Voice Activated Dialing, and Meet-me Conferencing.

When AIN first had been introduced, in terms of the service application creation process, the AIN architecture represented an important advance. AIN separated service development from switching, allowing service logic components to be developed more quickly and placed in specialized network elements attached to databases. Switches, in turn, being free from all service logic, could be optimized for speed and efficiency. Still, typical service applications which were developed to the AIN specification were written in specialized languages by specially trained programmers using specialized service creation environments.

Importantly, future telecommunications networks will be characterized by new and evolving network architectures where packet-switched, circuit-switched, and wireless networks are integrated to offer subscribers an array of innovative multimedia, multiparty applications. Equally important, it is expected that the process by which telecommunications applications are developed will change, and will no longer solely be the domain of the telecommunications network or service application provider. In fact, in order to provide a broad portfolio of novel, compelling applications rapidly, service application providers will increasingly turn to third-party applications developers and software vendors. Thus, application development in the telecommunications domain will become more similar to that of software and information technology in general, with customers reaping the benefits of increased competition, reduced time to market, and rapid leveraging of new technology as it is developed.

To make this vision a reality, the principles of AIN have been discarded in favor of a new service application component development paradigm. Specifically, it has been recognized that future integrated networks must offer application developers a set of standard, open APIs so that applications written for compatibility with one vendor's system can execute in the system of another vendor. In consequence, the cost of applications development can be amortized, reducing the final cost to the customer. JAVA programming language APIs for Integrated Networks (JAIN) fulfills the requirements of the new service application component development paradigm. Presently, JAIN includes standard, open published JAVA programming language APIs for next-generation systems consisting of integrated Internet Protocol (IP) or asynchronous transport mode (ATM) networks, PSTN, and wireless networks. The JAIN APIs include interfaces at the protocol level, for different protocols such as Media Gateway Control Protocol (MGCP), Session Initiation Protocol (SIP), and Transactional Capabilities Application Part (TCAP), as well as protocols residing in the higher layers of the telecommunications protocol stack.

JAIN includes a set of integrated network APIs for the JAVA programming language platform and an environment to build and integrate JAIN components into services or applications that work across PSTN, packet and wireless networks. The JAIN approach integrates wireline, wireless, and packet-based networks by separating service-based logic from network-based logic. FIG. 1 illustrates a conventional JAIN implementation. As shown in FIG. 1, a conventional JAIN implementation can include a protocol layer 102 which can include interfaces to IP, wireline and wireless signaling protocols. These protocols can include TCAP, ISUP, INAP, MAP, SIP, MGCP, and H.323. The JAIN implementation also can include a signaling layer 103 which can include interfaces to provide connectivity management and call control. The conventional JAIN implementation also can include an application layer 104 for handling secure network access and other external services. Finally, the conventional JAIN implementation can include a service layer 106 which can include a service creation and carrier grade service logic execution environment (SLEE) 108.

In JAIN, the protocol layer 102 and the signaling layer 103 are based upon a JAVA programming language standardization of specific signaling protocols and provide standardized protocol interfaces in an object model. Additionally, applications and protocol stacks can be interchanged all the while providing a high degree of portability to the applications in the application layer using protocol stacks from different sources. By comparison, the application layer 104 provides a single call model across all supported protocols in the protocol layer 102. Fundamentally, the application layer 104 provides a single state machine for multiparty, multimedia, and multiprotocol sessions for service components in the application layer 104. This state machine is accessible by trusted applications that execute in the application layer 104 through a call control API.

Notably, applications or services executing at the service level 102 can communicate directly with protocol adapters in the SLEE 108. Protocol adapters typically are class methods, callbacks, event or interfaces that encapsulate the underlying resources such as TCAP, MGCP, etc. The underlying resources can be implemented in many programming languages, but a JAIN-conformant protocol product must provide at least the relevant JAIN API. In contrast, an external application or service executing in the application layer 104 does not have to be aware of the underlying resources and can remain oblivious to the fact that some of its session or call legs may be using different protocols.

Service components 112 are the core JAIN components and can execute in the SLEE 108. More particularly, service components 112 are constructed according to a standard component model and, instantiations of component assemblies execute in coordination with the SLEE 108. Using information regarding the protocol layer 102 which can be incorporated into the SLEE 108, service components 112 can interact with the underlying protocol stacks without having specific knowledge of the protocol stack. Thus, service components 112 can use the call model provided by the signaling layer to implement telephony services. More importantly, the SLEE 108 can relieve the service components 112 of conventional lifecycle responsibilities by providing portable support for transactions, persistence, load balancing, security, and object and connection instance pooling. In this way, the service components 112 can focus on providing telephony services.

Presently, a user can change various aspects of a service such as call forwarding, call blocking, or messaging, through a Web-based interface such as a hypermedia document or HTML Web page running over the Internet. These service aspects can include service information such as telephone numbers to be blocked, times which particular numbers can be blocked, as well as other behavioral aspects of a service such as the type of message to be played to particular calling numbers or the number of rings before the messaging service answers the telephone. The service information and behavioral parameters of the service collectively can be referred to as service attributes and are conventionally stored within a separate database external to both the hypermedia document and the actual services which can be implemented with one or more service components 112. Once the user initiates changes to the service attributes from the hypermedia document, the service attribute information can be updated in a manner consistent with the user's desired changes.

As shown in FIG. 1, conventional systems for updating service attribute information typically are separate and distinct from the services which actually use the information. For example, once the user has requested a change to a service attribute, a hypermedia document 210 can access a database management component 116 to update the service attribute information in a service attribute database 114. Though the service components can contain service attribute information, the service component must access the service attribute information database 114 and synchronize its service attribute information with the updated information contained within the service attribute database 114. This synchronization process between the service component 112 and the service attribute database 114 often can require another separate and distinct component or service such as synchronization component 118. Notably, the database management component 116, the synchronization component 118, as well as the service attributes database 114, each operate external to the JSLEE 108.

SUMMARY OF THE INVENTION

The invention disclosed herein concerns a method and a system for providing a Web-based interface for directly changing service attributes and corresponding service attribute information. In particular, the invention disclosed herein can provide a common interface for both subscribers and service provider personnel for updating preferences of a subscriber's service. The service attributes and the service attribute information can be contained within a service component executing within a service logic execution environment (SLEE).

The invention can provide this functionality using a hypermedia document in conjunction with the service component without the aid of external applications or services. The hypermedia document can generate a SLEE compatible event responsive to a user request to alter or change service attributes of a service component. The service component can be configured to receive events generated by the hypermedia document interface via the SLEE. Upon receiving such an event, the service component can update service attribute information existing within the service component in a manner consistent with the received event. Accordingly, the service component can include the necessary functionality for updating any service attribute information contained therein and need not access an external database or an external component for accessing such an external database.

One aspect of the present invention can include a method of directly changing a service attribute corresponding to a service component through a hypermedia document. The hypermedia document can provide an interface to a SLEE. The method can include providing a plurality of selections embodied in the hypermedia document, wherein the plurality of selections can correspond to the service attribute. A user specified selection can be received in the hypermedia document and a SLEE compatible event can be generated based on the user selection. The event can be of a type which the service component has been registered in the SLEE to receive. The event can be routed to the service component via the SLEE. The service component can process the event and can update service attribute information corresponding to the service attribute consistent with the event. Also, an acknowledgment event can be received from the service component.

Another embodiment of the invention can include registering the service component with the SLEE for receiving a SLEE compatible event generated by the hypermedia document. The event can be posted to the SLEE and can be received by the service component. The method further can include updating service attribute information corresponding to the service attribute in the service component. The updating of service attribute information can be consistent with the received event. An acknowledgment event can be routed from the service component to a location in a computer communication network containing the hypermedia document.

Another aspect of the invention can include a machine readable storage, having stored thereon a computer program having a plurality of code sections executable by a machine for causing the machine to perform a series of steps. In that case, the steps can include providing a plurality of selections embodied in a hypermedia document, wherein the plurality of selections can correspond to a service attribute. The service attribute can correspond to a service component executing in a SLEE and the hypermedia document can provide an interface to the SLEE. The method also can include receiving a user specified selection in the hypermedia document and generating a SLEE compatible event based on the user selection. The event can be of a type which the service component has been registered in the SLEE to receive. Also, the event can be routed to the service component via the SLEE. The service component can process the event and update service attribute information corresponding to the service attribute consistent with the event. An acknowledgment event can be received from the service component.

Another embodiment of the invention can include registering a service component with a SLEE for receiving a SLEE compatible event generated by a hypermedia document. The hypermedia document can provide an interface to the SLEE. The event, being posted to the SLEE, can be received by a service component. Service attribute information corresponding to the service component executing in the SLEE can be updated. The updating of service attribute information can be consistent with the received event. Finally, an acknowledgment event can be routed from the service component to a location in a computer communications network containing the hypermedia document.

BRIEF DESCRIPTION OF THE DRAWINGS

There are shown in the drawings embodiments of which are presently preferred, it being understood, however, that the invention is not so limited to the precise arrangements and instrumentalities shown, wherein.

DETAILED DESCRIPTION OF THE INVENTION

The invention disclosed herein concerns a method and a system for providing a Web-based interface for directly changing service attributes and corresponding service attribute information. The service attributes and the service attribute information can be contained within a service component executing within a service logic execution environment (SLEE). In particular, the invention can provide this functionality without the aid of external applications or services. The service component can be configured to receive events generated by the Web-based interface via the SLEE. Thus, upon receiving such an event, the service component can update service attribute information existing within the service component in a manner consistent with the received event. Accordingly, the service component can include the necessary functionality for updating any service attribute information contained therein and need not access an external database or an external component for accessing such an external database.

Figure 1:
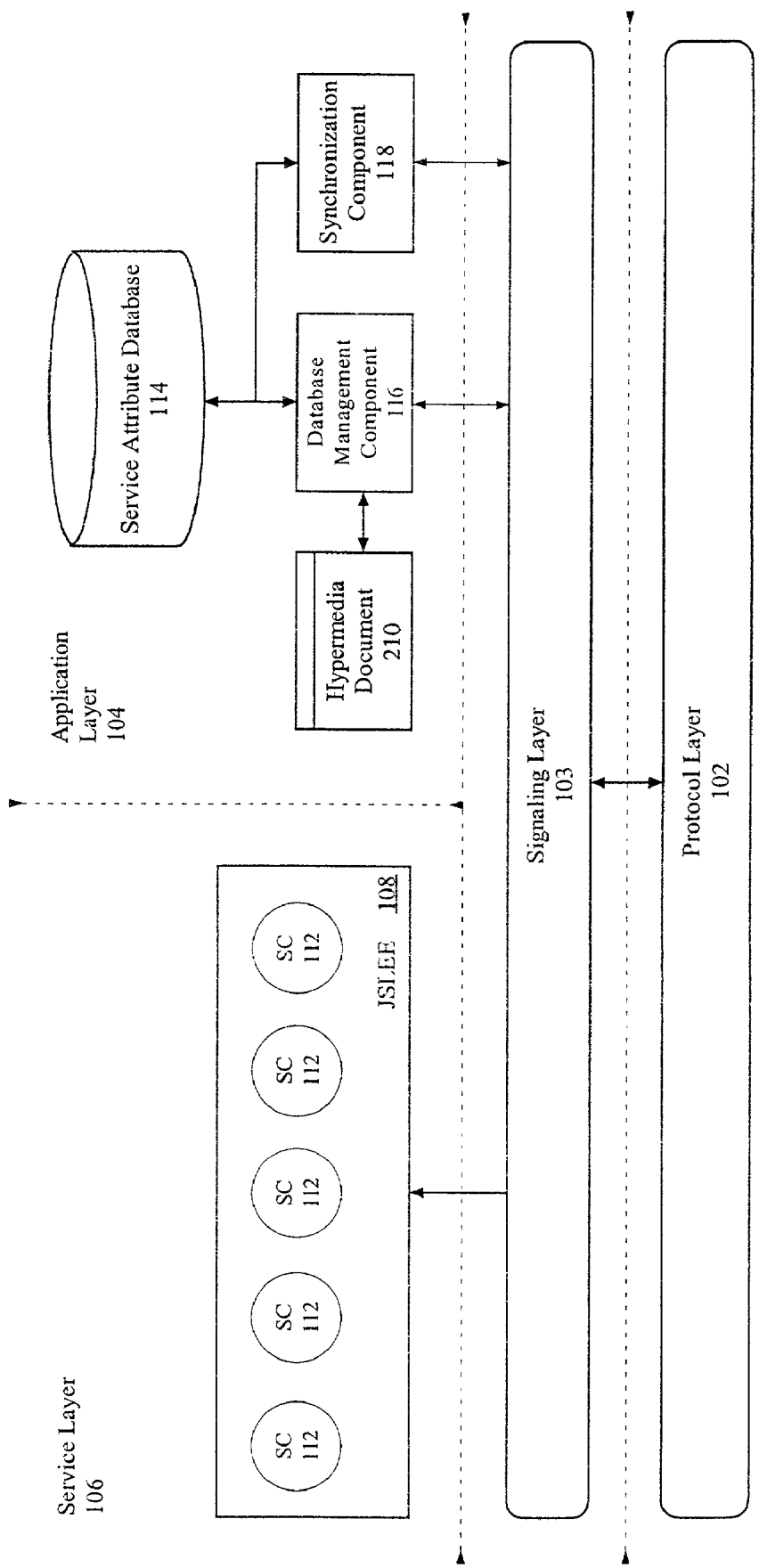
FIG. 1 is a schematic representation of an intelligent network architecture configured in accordance with a conventional JAIN implementation known in the prior art.
Figure 2:
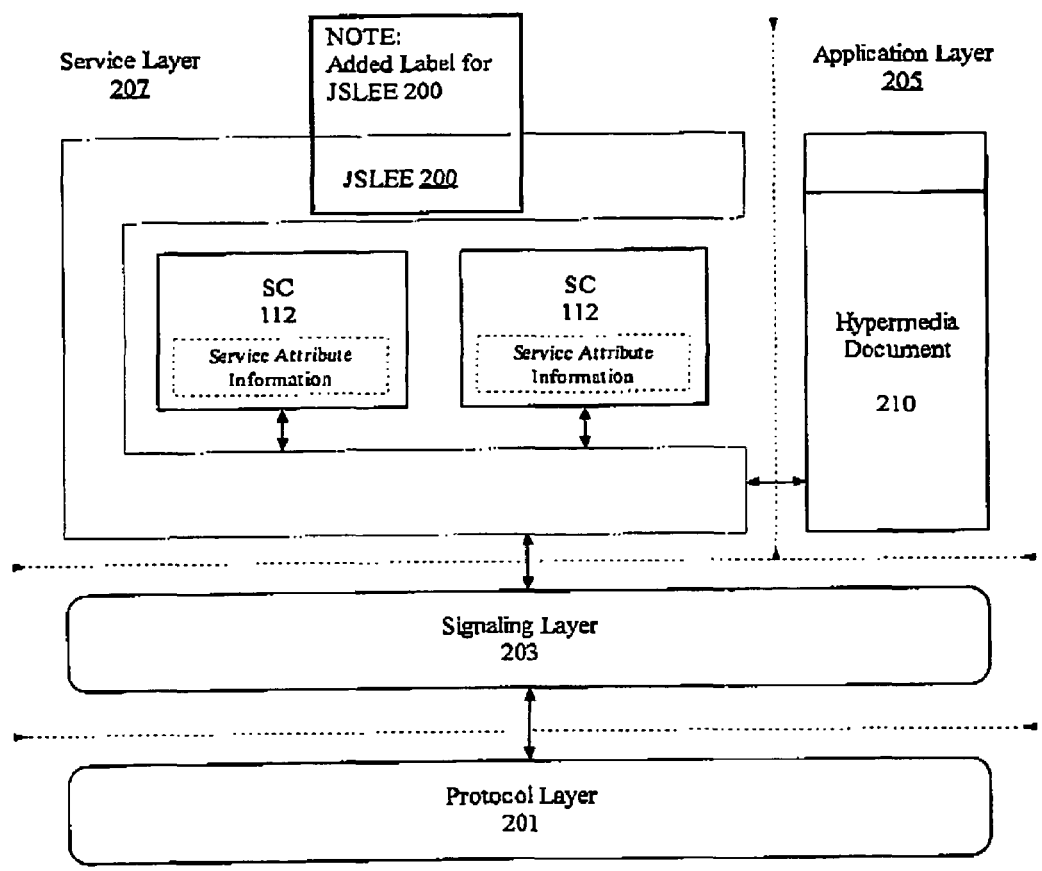
FIG. 2 is a schematic representation of an intelligent network architecture configured in accordance with the inventive arrangements disclosed herein.

FIG. 2 is a schematic illustration of a JAIN-compliant intelligent network configured in accordance with the inventive arrangements. The JAIN-compliant network can include a protocol layer 201, a signaling layer 203, an application layer 205, and a service layer 207. The application layer 205 can host external third party applications. Typical third party applications can suit mass-market demand for services such as virtual private networks (VPNs), inbound services and unified messaging. External third party applications also can include short-lived and niche applications which can be deployed using un-trusted application space deployment technologies such as database lookup interfaces, downloadable mechanisms, and the Parlay API, as are well known in the art. Notably, external applications can include hypermedia documents 210 which can be contained within a Web server connected to the World Wide Web.

The hypermedia document 210 can include subscriber information such as phone number lists, access codes, time of day or day of week information, and the like. Service execution options such as preference execution orders, precedence, exceptions, inclusions, and the like can be included as well. The preference execution order can specify the manner in which a service behaves. For example, the preferences for an answering machine service can specify that for particular incoming calls originating from a particular telephone number, a specific or customized message can be played. Thus, designated business associates can hear one message, designated family members another message, while particular friends can hear yet another message. Further, the preferences can specify an ordering of service features. In that case, the preferences can specify that a call should be screened first, a recording then can be offered, and for particular calling numbers, the called subscriber can be paged.

Precedence can specify particular cases wherein the normal ordering of service features can be defeated. For example, if a telephone call originates from a particular telephone number, the normal ordering of features and the behavior of the service can be altered. Exception and inclusion, which are known in the art, generally can refer to various exception conditions.

The hypermedia document 210 further can present a subscriber with current, real-time usage measurements of the individual service execution components as well as near real-time information. This data can be made available to subscribers in addition to historical data such that future decisions can be made based upon preferences or desired results from past service execution. Those skilled in the art will recognize that the hypermedia document 210 can provide a common interface for both subscribers and service provider personnel for changing service attributes of a subscriber's service.

The service layer 207 can include a SLEE server such as a JSLEE Server 200 which can be configured for compatibility with the JAIN specification. The protocol layer 201 can include one or more protocol stacks which can be configured to interact with the service components 112 executing in the JSLEE Server 200 through a signaling layer 203. Notably, the invention is not limited in regard to the number or type of protocol stacks. Rather, the JSLEE Server 200 can interact with any protocol stack, for example those protocol stacks configured in accordance with the JAIN specification.

The JSLEE Server 200 also can include several lifecycle management functions. In particular, the service components 112 can be properly loaded within the JSLEE Server 200 for execution. The JSLEE Server 200 can identify configuration and loading parameters associated with each service component 112 to be loaded. Subsequently, the JSLEE Server 200 can execute the service components 112 using the identified configuration and loading parameters. Finally, the service components 112 can register with an internal event handling component in the JSLEE Server 200 so that events can be transmitted to and from the service components 112 executing in the JSLEE Server 200.

In operation, the JSLEE Server 200 can transmit and receive events to and from the protocol stacks in the protocol layer 201. More particularly, the events can be transmitted and received in the event handling component included in the JSLEE Server 200. Likewise, service components 112 which are registered with the JSLEE Server can receive protocol stack events directed towards particular ones of the service components 112. More specifically, the event handling component can route received events to service components 112 which have registered with the JSLEE Server 200 to receive such events. The service components 112 further can post protocol stack events to the JSLEE Server 200.

Figure 3:
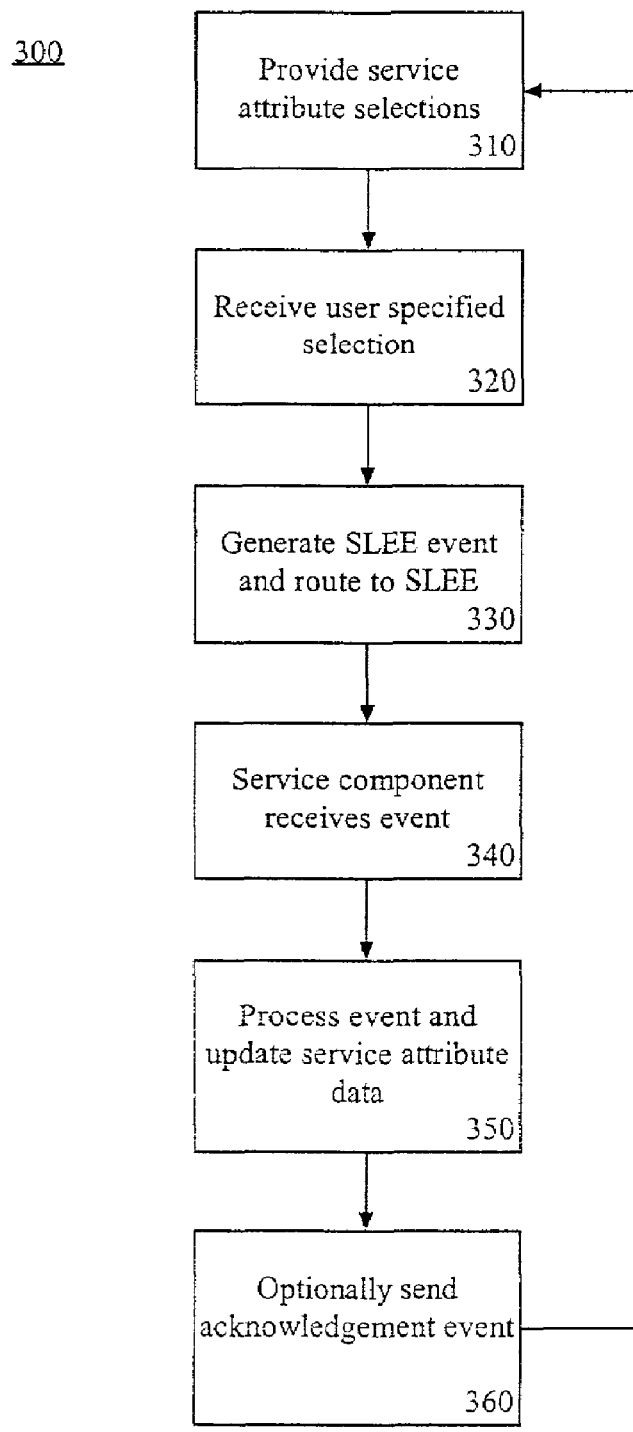
FIG. 3 is a flow chart illustrating an exemplary method of changing service attributes.

FIG. 3 is a flow chart 300 illustrating an exemplary method of changing service attributes from a Web-based interface. The method of the invention can begin in step 310 where one or more service attribute selections can be presented to a user using a conventional hypermedia document such as a Web page contained within a Web server. In particular, the Web page can include a series of predetermined options from which the user can choose. For example, the user can select items from a list or be guided through a step by step process of selecting from various service attributes. Alternatively, the user can be provided a text box or other interface for entering text such as phone numbers, times, dates, number of rings, or other parameters corresponding to a particular service. After completion of step 310, the method can continue to step 320.

In step 320, the hypermedia document can receive one or more user specified selections. In step 330, the hypermedia document can generate a SLEE compatible event. For example, the hypermedia document can utilize servlet technology to dynamically generate such events responsive to one or more user selections. Once a SLEE compatible event is generated, the event can be routed to the SLEE server via HTTP and TCP/IP with reference to the SLEE server's URL. After completion of step 330, the method can continue to step 340.

In step 340, the event can be posted to the SLEE server. A service component being registered with the SLEE server to receive such events can receive the event. In step 350, the service component can process or translate the received event such that the service attribute information within the service component can be updated according to the parameters within the received event. After completion of step 350, the method can proceed to step 360.

In step 360, the service component optionally can post an acknowledgment to the SLEE for routing to the Web server and hypermedia document contained therein. Accordingly, information contained within the acknowledgment can be presented to the user by dynamically creating a Web page for presenting that information. For example, the Web page can incorporate dynamic web content creation technology such as JAVA programming language Server Pages. In this manner, two-way communications can be established between the SLEE server and the Web server. Notably, the SLEE server can include service components for sending and receiving information to and from servers on the Internet, as well as service components which can contain and change service attributes. As previously mentioned, these service components can communicate with one another via the event handling component of the SLEE server.

The present invention can be realized in hardware, software, or a combination of hardware and software. A method and system for directly changing service attributes through a Web-based interface according to the present invention can be realized in a centralized fashion in one computer system, or in a distributed fashion where different elements are spread across several interconnected computer systems. Any kind of computer system—or other apparatus adapted for carrying out the methods described herein is suited. A typical combination of hardware and software could be a general purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method of directly changing a telecommunication service attribute comprising:

providing a plurality of selections embodied in a hypermedia document, said plurality of selections corresponding to a telecommunication service attribute contained within a Java applications programming interface for integrated networks (JAIN) compliant service component executing within a Java service logic execution environment (JSLEE), said telecommunication service attribute associated with a telecommunication subscriber;

receiving a user specified selection in said hypermedia document for changing a telecommunication service attribute of a subscriber's service in a JAIN compliant service component;

in an event handling component associated with, said hypermedia document, generating a JSLEE compatible event based on said user selection, said event being of a type for which said JAIN compliant service component within said JSLEE has registered to receive;

at said event handling component, routing said event to said JAIN compliant service component via said JSLEE, for directly sending and receiving protocol stack events to a protocol layer without accessing an external database for processing said event, said protocol layer including said one or more protocol stacks configured by said JSLEE for directly interacting with said JAIN compliant service component thereby separating service-based logic from network-based logic, executing said service component using a configuration and loading parameter provided by said event of said user specified selection; and updating a JAIN compliant telecommunication service attribute information within said JAIN compliant service component corresponding to said telecommunication service attribute consistent with said event, wherein a change in a telecommunication service corresponding to the telecommunication service attribute results from the updating step, and wherein subsequent to the change, the telecommunication subscriber experiences different service behavior whenever the telecommunication subscriber utilizes the telecommunication service through a phone, said different service behavior corresponding to the updated service attribute information.

2. The method of claim 1, further comprising receiving an acknowledgment event from said JAIN compliant service component, and wherein said hypermedia document provides a common interface available to the telecommunication subscriber and to service provider personnel.

3. The method of claim 1, wherein said user is said associated telecommunication subscriber.

4. The method of claim 1, wherein said user is an agent of a service provider that provides the telecommunication service.

5. The method of claim 1, further comprising the steps of:

presenting the user viewing the hypermedia document with subscriber information for the telecommunication subscriber.

6. The method of claim 5, the presenting step further comprising;

presenting the user with current real-time usage measurements for the telecommunication service.

7. The method of claim 1, further comprising:
presenting the user viewing the hypermedia document with lifecycle management information relating to the JAIN compliant service component.

8. The method of claim 1, further comprising;
presenting the user viewing the hypermedia document with lifecycle management information relating to the JAIN compliant service component.

9. A method of directly changing a telecommunications service attribute corresponding to a JAIN compliant service component through a hypermedia document, said hypermedia document providing an interface to a Java service logic execution environment (JSLEE), said method comprising:
registering said JAIN compliant service component with said JSLEE for receiving a JSLEE compatible event generated by said hypermedia document;
receiving said event, said event being posted to said JSLEE;
routing said event to said JAIN compliant service component via said JSLEE for directly sending and receiving protocol stack events to a protocol layer without accessing an external database for processing said event,
said protocol layer including said one or more protocol stacks configured by said JSLEE for directly interacting with said JAIN compliant service component thereby separating service-based logic from network-based logic,
executing said service component using a configuration and loading parameter provided by said event; and
updating service attribute information corresponding to said telecommunications service attribute in said JAIN compliant service component, said telecommunications service attribute being associated with a telecommunication subscriber, said updating of service attribute information being consistent with said received event, wherein a change in a telecommunication service corresponding to the service attribute results from the updating step, and wherein subsequent to the change, the telecommunication subscriber experiences different service behavior whenever the telecommunication subscriber utilizes the telecommunication service through a phone, said different service behavior corresponding to the updated service attribute information, and wherein the service component includes necessary functionality for performing the updating step without accessing a database external to said service component.

10. The method of claim 9, further comprising routing an acknowledgment event from said JAIN compliant service component to a location in a computer communications network containing said hypermedia document, wherein said hypermedia document provides a common interface available to the telecommunication subscriber and to service provider personnel.

11. A machine readable storage, having stored thereon a computer program having a plurality of code sections executable by a machine for causing the machine to perform the steps of:
providing a plurality of selections embodied in a hypermedia document, said plurality of selections corresponding to a telecommunication service attribute contained within a Java applications programming interface for integrated networks JAIN compliant service component executing within a Java service logic execution environment (JSLEE), said telecommunication service attribute associated with a telecommunication subscriber, and said hypermedia document providing an interface to said JSLEE;
receiving a user specified selection in said hypermedia document;
in an event handling component associated with said hypermedia document, generating a JSLEE compatible event based on said user selection, said event being of a type for which said JAIN compliant service component within said JSLEE has registered to receive;
at said event handling component, routing said event to said JAIN compliant service component via said JSLEE, for directly sending and receiving protocol stack events to a protocol layer without accessing an external database for processing said event,
said protocol layer including said one or more protocol stacks configured by said JSLEE for directly interacting with said JAIN compliant service component thereby separating service-based logic from network-based logic,
executing said service component using a configuration and loading parameter provided by said event of said user specified selection; and
updating a JAIN compliant telecommunication service attribute information within said JAIN compliant service component corresponding to said telecommunication service attribute consistent with said event,
wherein a change in a telecommunication service corresponding to the service attribute results from the updating step, and wherein subsequent to the change, the telecommunication subscriber experiences different service behavior whenever the telecommunication subscriber utilizes the telecommunication service through a phone, said different service behavior corresponding to the updated service attribute information.

12. The machine readable storage of claim 11, further comprising receiving an acknowledgment event from said JAIN compliant service component, and wherein said hypermedia document provides a common interface available to the telecommunication subscriber and to service provider personnel.

13. The machine readable storage of claim 11, wherein said user is said associated telecommunication subscriber.

14. The machine readable storage of claim 11, wherein said user is an agent of a service provider that provides the telecommunication service.

15. The machine readable storage of claim 11, further comprising the steps of:
presenting the user viewing the hypermedia document with subscriber information for the telecommunication subscriber.

16. The machine readable storage of claim 15, the presenting step further comprising:
presenting the user with current real-time usage measurements for the telecommunication service.

17. The machine readable storage of claim 11, further comprising:
presenting the user viewing the hypermedia document with lifecycle management information relating to the service component.

18. A machine readable storage, having stored thereon a computer program having a plurality of code sections executable by a machine for causing the machine to perform the steps of:
registering a JAIN compliant service component with a Java service logic execution environment JSLEE for receiving a JSLEE compatible event generated by a hypermedia document, said hypermedia document providing an interface to said JSLEE;

receiving said event, said event being posted to said JSLEE;

routing said event to said JAIN compliant service component via said JSLEE for directly sending and receiving protocol stack events to a protocol layer without accessing an external database for processing said event, said protocol layer including said one or more protocol stacks configured by said JSLEE for directly interacting with said JAIN compliant service component thereby separating service-based logic from network-based logic, executing said service component using a configuration and loading parameter provided by said event; and updating service attribute information corresponding to said telecommunications service attribute in said JAIN compliant service component, said telecommunications service attribute being associated with a telecommunication subscriber, said updating of service attribute information being consistent with said received event, wherein a change in a telecommunication service corresponding to the service attribute results from the updating step, and wherein subsequent to the change, the telecommunication subscriber experiences different service behavior whenever the telecommunication subscriber utilizes the telecommunication service through a phone, said different service behavior corresponding to the updated service attribute information, and wherein the service component includes necessary functionality for performing the updating step without accessing a database external to said service component.

19. The machine readable storage of claim 18, further comprising routing an acknowledgment event from said JAIN compliant service component to a location in a computer communications network containing said hypermedia document, wherein said hypermedia document provides a common interface available to the telecommunication subscriber and to service provider personnel.

* * * * *